United States Patent
Ren et al.

(10) Patent No.: US 8,761,067 B2
(45) Date of Patent: Jun. 24, 2014

(54) METHOD AND APPARATUS FOR NOTIFICATION OF EMITTED ENERGY

(75) Inventors: Xiaotao Ren, Beijing (CN); Lei Wan, Beijing (CN); Zhiyu Yan, Beijing (CN); Yajun Zhao, Shenzhen (CN); Xiaoan Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 13/469,512

(22) Filed: May 11, 2012

(65) Prior Publication Data

US 2012/0224559 A1    Sep. 6, 2012

Related U.S. Application Data

(63) Continuation of application No. PCT/CN2010/078673, filed on Nov. 12, 2010.

(30) Foreign Application Priority Data

Nov. 13, 2009    (CN) .......................... 2009 1 0109651

(51) Int. Cl.
    *G08C 17/00*    (2006.01)
(52) U.S. Cl.
    USPC ............................. 370/311; 370/236; 370/252
(58) Field of Classification Search
    USPC ......... 370/202, 229, 230, 236, 252, 311, 318, 370/328, 330
    See application file for complete search history.

(56) References Cited

U.S. PATENT DOCUMENTS

| 7,570,953 | B2 | 8/2009 | Maltsev et al. |
| 7,636,334 | B2 * | 12/2009 | Gerlach ........................ 370/330 |
| 8,140,102 | B2 * | 3/2012 | Nory et al. .................... 455/522 |
| 2007/0173276 | A1 | 7/2007 | Love et al. |
| 2008/0259802 | A1 * | 10/2008 | Pedersen et al. .............. 370/235 |

(Continued)

FOREIGN PATENT DOCUMENTS

| CN | 101534548 | 9/2009 |
| CN | 101540625 | 9/2009 |
| EP | 2086153 | 8/2009 |
| RU | 2262198 C1 | 10/2005 |

OTHER PUBLICATIONS

Search Report, dated Dec. 4, 2012 in corresponding Chinese Application No. 200910109651.3 (2 pp.).

(Continued)

*Primary Examiner* — Kwang B Yao
*Assistant Examiner* — Nguyen Ngo
(74) *Attorney, Agent, or Firm* — Staas & Halsey LLP (57) ABSTRACT

The present invention discloses a method and an apparatus for notification of emitted energy. The method includes: performing an emitted energy decrease on resource elements in a current cell that have a same time-frequency location as part or all of resource elements where a reference signal of a neighboring cell is located; obtaining an emitted energy parameter of an energy non-decreased resource element (NRE) in the current cell according to a decreased amount of emitted energy of an emitted energy decreased resource element (DRE); and notifying the emitted energy parameter of the NRE to a user equipment (UE). According to embodiments of the present invention, the waste of emitted energy may be avoided, the emitted energy of part of REs is increased, and further, the signal to interference plus noise ratio (SINR) and throughput of service data may be increased.

14 Claims, 5 Drawing Sheets

(56) References Cited

U.S. PATENT DOCUMENTS

| | | | |
|---|---|---|---|
| 2008/0273610 A1* | 11/2008 | Malladi et al. | 375/260 |
| 2009/0232101 A1 | 9/2009 | Papasakellariou et al. | |
| 2010/0097937 A1* | 4/2010 | Pietraski et al. | 370/241 |
| 2010/0248736 A1* | 9/2010 | Hulkkonen et al. | 455/452.2 |
| 2011/0134879 A1* | 6/2011 | Ogawa et al. | 370/330 |
| 2011/0255514 A1* | 10/2011 | Olofsson et al. | 370/331 |
| 2012/0076106 A1* | 3/2012 | Bhattad et al. | 370/330 |

OTHER PUBLICATIONS

Extended European Search Report, dated Jan. 8, 2013, in corresponding European Application No. 10829539.5 (5 pp.).

International Search Report mailed Feb. 17, 2011 issued in corresponding International Patent Application No. PCT/CN2010/078673.

Written Opinion of the international Searching Authority mailed Feb. 17, 2011 issued in corresponding International Patent Application No. PCT/CN2010/078673.

Huawei, "Power Allocation among eNBs in Closed-Loop Downlink CoMP Transmission with CA", 3GPP TSG RAN WG1 Meeting #56, Mar. 2009, pp. 1-6.

International Search Report for PCT/CN2010/078673 mailed Feb. 17, 2011.

Russian Notice of Allowance issued Nov. 12, 2013 in corresponding Russian Patent Application No. 2012124068/07.

* cited by examiner

METHOD AND APPARATUS FOR NOTIFICATION OF EMITTED ENERGY

CROSS-REFERENCE TO RELATED APPLICATIONS

This application is a continuation of International Application No. PCT/CN2010/078673, filed on Nov. 12, 2010, which claims priority to Chinese Patent Application No. 200910109651.3, filed on Nov. 13, 2009, both of which are hereby incorporated by reference in their entireties.

FIELD OF THE INVENTION

The present invention relates to the field of communications technologies, and in particular, to a method and an apparatus for notification of emitted energy.

BACKGROUND OF THE INVENTION

A fourth-generation mobile communication system may provide a higher peak user throughput, average user throughput, and edge user throughput, and provide a better data transmission experience for users.

Coordinated multi-point (CoMP) processing is introduced to the fourth-generation mobile communication system to obtain a higher user throughput. In a CoMP scenario, multiple cells provide data transmission services for one UE simultaneously. In a CoMP scenario, which is different from a conventional scenario where a UE is served by a single cell, a user equipment (UE) needs to measure reference signals sent by multiple serving base stations, estimate the information of downlink channel from the multiple base stations, and feed back the downlink channel information.

To reduce the interference of data on the reference signal of a neighboring cell and improve accuracy of channel estimation, an RE, which collides with an RE where the reference signal of the neighboring cell is located, may be punctured. However, no solution to energy notification after puncturing is available at present.

SUMMARY OF THE INVENTION

An embodiment of the present invention provides a method for notification of emitted energy, including:

performing an emitted energy decrease on a resource element in a current cell that has a same time-frequency location as part or all of resource elements where a reference signal of a neighboring cell is located;

obtaining an emitted energy parameter of an energy non-decreased resource element (NRE) in the current cell according to a decreased amount of emitted energy of an emitted energy decreased resource element (DRE); and notifying the emitted energy parameter of the NRE to a user equipment (UE).

An embodiment of the present invention provides another method for notification of emitted energy, including:

obtaining an emitted energy parameter that is of an energy non-decreased resource element (NRE) and is notified by a base station;

wherein, the emitted energy parameter of the NRE is obtained by the base station according to a decreased amount of emitted energy which is an amount decreased by the base station from emitted energy of a resource element in a current cell that has a same time-frequency location as part or all of resource elements where a reference signal of a neighboring cell is located;

Perform corresponding processing according to the obtained emitted energy parameter.

An embodiment of the present invention provides a base station, including:

an energy decreasing unit, configured to perform an emitted energy decrease on a resource element in a current cell that has a same time-frequency location as part or all of resource elements where a reference signal of a neighboring cell is located;

an emitted energy parameter obtaining unit, configured to obtain an emitted energy parameter of an energy non-decreased resource element (NRE) in the current cell according to a decreased amount of emitted energy of an emitted energy decreased resource element (DRE); and an emitted energy notifying unit, configured to notify the emitted energy parameter of the NRE to a user equipment (UE).

An embodiment of the present invention provides a user equipment (UE), including:

an energy parameter obtaining unit, configured to obtain an emitted energy parameter that is of an energy non-decreased resource element (NRE) and is notified by a base station;

where the emitted energy parameter of the NRE is obtained by the base station according to a decreased amount of emitted energy which is an amount decreased by the base station from emitted energy of a resource element in a current cell that has a same time-frequency location as part or all of resource elements where a reference signal of a neighboring cell is located;

a processing unit, configured to perform corresponding processing according to the emitted energy parameter of the NRE.

In the embodiments of the present invention, according to the decreased amount of energy, the emitted energy parameter of the NRE is obtained and notified to the UE, which may avoid the waste of the emitted energy, and increase the emitted energy of part of REs, thus increasing the signal to interference plus noise ratio (SINR) and throughput of service data.

BRIEF DESCRIPTION OF THE DRAWINGS

To make the technical solutions of the present invention or the prior art clearer, the accompanying drawings used in the description of the embodiments or the prior art are briefly described in the following. Evidently, the accompanying drawings illustrate some exemplary embodiments of the present invention and persons skilled in the art may derive other drawings from these drawings without creative efforts.

DETAILED DESCRIPTION OF THE EMBODIMENTS

Figure 1:
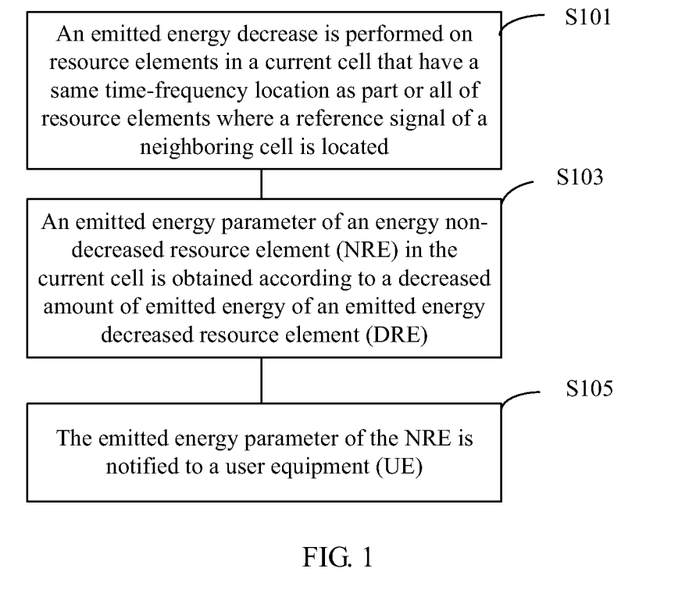
FIG. 1 is a flowchart of a method for notification of emitted energy according to an embodiment of the present invention.

As shown in FIG. 1, a method for notification of emitted energy according to an embodiment of the present invention includes the following steps:

S101: Perform an emitted energy decrease on a resource element in a current cell that has a same time-frequency location as part or all of resource elements where a reference signal of a neighboring cell is located.

An energy decrease is only performed on part of a resource element (Resource Element RE) colliding with the reference signal of the neighboring cell, that is, part of the RE having the same time-frequency location as the reference signal of the neighboring cell, thus reducing the number of emitted energy decreased resource elements (DREs), and increasing the number of available REs that may be used for normal data transmission or other purposes.

For an energy decrease, specifically, the emitted energy of the resource element in the current cell that has the same time-frequency location as part or all of resource elements where a reference signal of a neighboring cell is located, may be decreased partly or completely, that is, only a part of the emitted energy of a DRE is decreased (specifically the energy is set to a value lower than normal emitted energy), or the emitted energy of the DRE is decreased to 0 (that is, punctured).

The decreasing only a part of the emitted energy of the DRE may reduce the interference on the reference signal of the neighboring cell, and may also be used for data transmission or other purposes for increasing the resource utilization.

Figure 2:
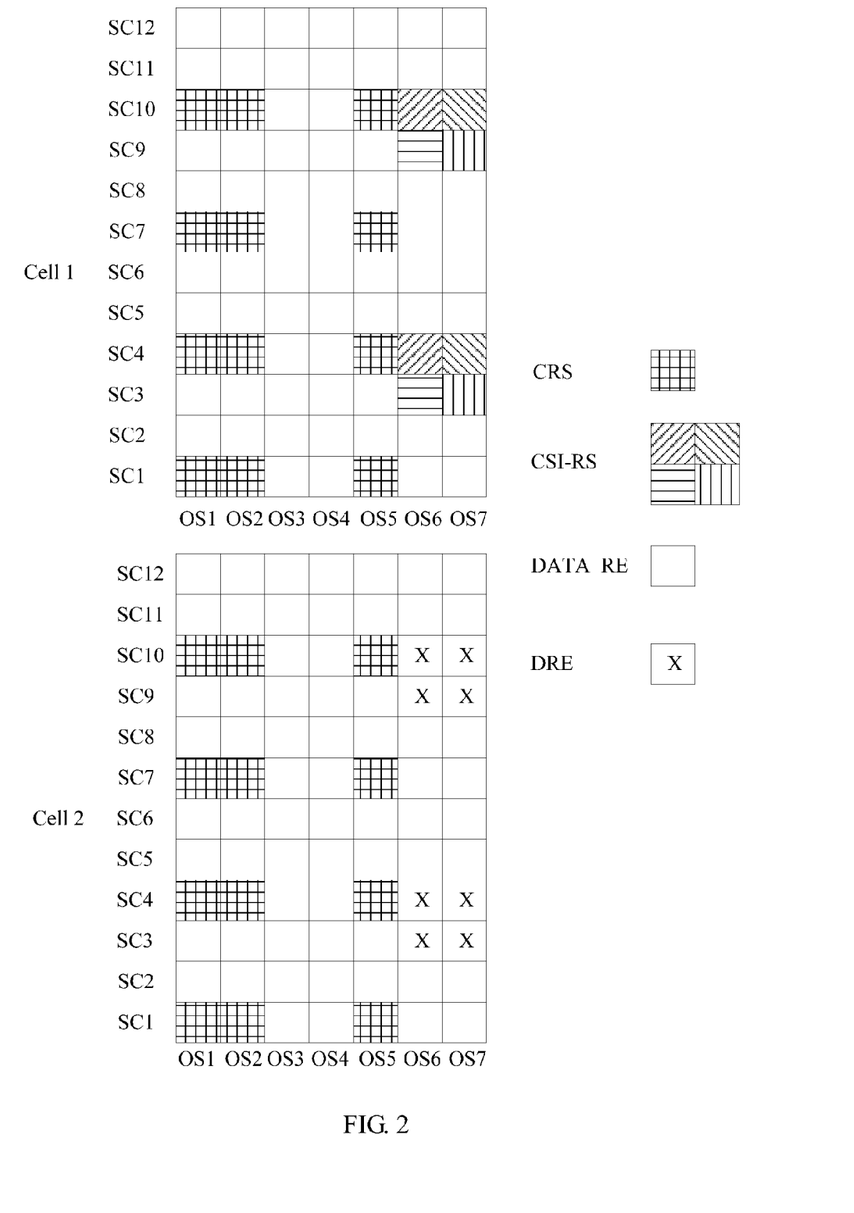
FIG. 2 is a schematic diagram of an energy decrease according to an embodiment of the present invention.

As shown in FIG. 2, in the schematic diagram of an energy decrease according to an embodiment of the present invention, cell 2 is a current cell, and cell 1 is a neighboring cell of cell 2; 8 REs on orthogonal frequency division multiplexing (Orthogonal Frequency Division Multiplexing, OFDM) symbols OS6 and OS7 in cell 2 collide with REs where a channel state information reference signal (CSI-RS) is located at a corresponding location in cell 1. An energy decrease may be performed on part or all of the 8 REs, (DRE is represented by "X" in FIG. 2) to ensure that the CSI-RS of cell 1 is not interfered with by cell 2. Similar methods may also be used to decrease the energy of an RE colliding with a common reference signal (CRS), and the corresponding solution is not illustrated in FIG. 2.

S103: Obtain an emitted energy parameter of an energy non-decreased resource element (NRE) in the current cell according to a decreased amount of emitted energy of an emitted energy decreased resource element (DRE).

The emitted energy parameter of the NRE may be the emitted energy of the NRE, or may be a ratio of the emitted energy of the NRE to standard emitted energy, $$\rho_c = \frac{EPRE_{NRE}}{EPRE_{Std}},$$

or a difference $\rho_c = EPRE_{NRE} - EPRE_{Std}$, where $EPRE_{Std}$ is the standard emitted energy, and $EPRE_{NRE}$ is the emitted energy of the NRE.

Usually the emitted energy of a reference signal may be used as standard emitted energy. Specifically, the emitted energy $EPRE_{CRS}$ of a CRS or the emitted energy $EPRE_{CSI-RS}$ of a CSI-RS may be used as standard emitted energy. When both the CRS and the CSI-RS exist, the UE may be notified, through high-layer signaling, of using $EPRE_{CRS}$ or $EPRE_{CSI-RS}$ as the standard emitted energy.

All NREs may have the same emitted energy parameter, or different emitted energy parameters may be set according to a UE that a NRE belongs to or according to a type of a NRE.

Specifically, when the NRE is a resource element occupied by a reference signal, the emitted energy parameter $$\rho_{c1} = \frac{EPRE'_{Reference\ Signal}}{EPRE_{Std}}$$

may be set for notifying the emitted energy parameter of the reference signal after the emitted energy is increased; when the NRE is a resource element occupied by a data signal, the emitted energy parameter $$\rho_{c2} = \frac{EPRE'_{Data\ Signal}}{EPRE_{Std}}$$

may be set for notifying the emitted energy parameter of the data signal after the emitted energy is increased. When the NRE includes both a resource element occupied by a reference signal and a resource element occupied by a data signal, two parameters $\rho_{c1}$ and $\rho_{c2}$ may be set simultaneously for notifying the UE of the emitted energy parameters of the data signal and reference signal in the NRE. $EPRE'_{Reference\ Signal}$ is the EPRE of the reference signal after the emitted energy is increased, and $EPRE'_{Data\ Signal}$ is the EPRE of the data signal after the emitted energy is increased.

Specifically, when the reference signal includes both the CSI-RS and the CRS and when the NRE is a resource element occupied by a reference signal, $$\rho_{c3} = \frac{EPRE'_{CSI-RS}}{EPRE_{Std}} \text{ and } \rho_{c4} = \frac{EPRE'_{CRS}}{EPRE_{Std}}$$

may be set seperately for notifying the energy parameter after the energy of the reference signal is increased, where $EPRE'_{CSI-RS}$ is the EPRE of the CSI-RS after the emitted energy is increased, and $EPRE'_{CRS}$ is the EPRE of the CRS after the emitted energy is increased; when the reference signal includes both the CSI-RS and the CRS and when the NRE is a resource element occupied by a data signal, three parameters $\rho_{c3}$, $\rho_{c4}$, and $\rho_{c2}$ are required for notifying the emitted energy parameter of the NRE. The parameter setting method in the case that the NRE includes other different combinations of RE types is similar to the above method, and is not described here.

The specific method for obtaining emitted energy of the NRE may be: increasing the emitted energy of part or all of the NREs to obtain the emitted energy of the NRE, where the increased amount of emitted energy of the NRE is not greater than the decreased amount of emitted energy of the DRE on the symbol where the NRE is located.

The NRE may include: a resource element occupied by a reference signal and/or a resource element occupied by a data signal. That is, the decreased amount of emitted energy may be used to increase the emitted energy of the RE of the data or used to increase the emitted energy of the RE of the reference signal, such as the CRS RE or CSI-RS RE.

S105: Notify the emitted energy parameter of the NRE to a user equipment (UE).

The specific way for notification of the emitted energy parameter of the NRE may include:

notifying the emitted energy parameter of the NRE to the UE through signaling;

or, through binding the identity of the current cell or the identity of the neighboring cell with the emitted energy parameter of the NRE, obtaining, by the UE, the emitted energy parameter of the NRE according to the identity of the current cell or the identity of the neighboring cell.

The method may further include:

notifying the location of the NRE corresponding to the emitted energy parameter to the UE, so that the UE obtains the emitted energy of the NRE located there according to the emitted energy parameter.

The location of the NRE may be notified to the UE through high-layer signaling, or may be notified implicitly, that is, the cell identity is bound with the location of the NRE, so that the UE obtains the location of the NRE according to the cell ID. For example, the identity of the current cell may be bound with the location of the RE occupied by a data unit; the resource element occupied by the reference signal is bound with the identity of the neighboring cell.

Figure 3A:
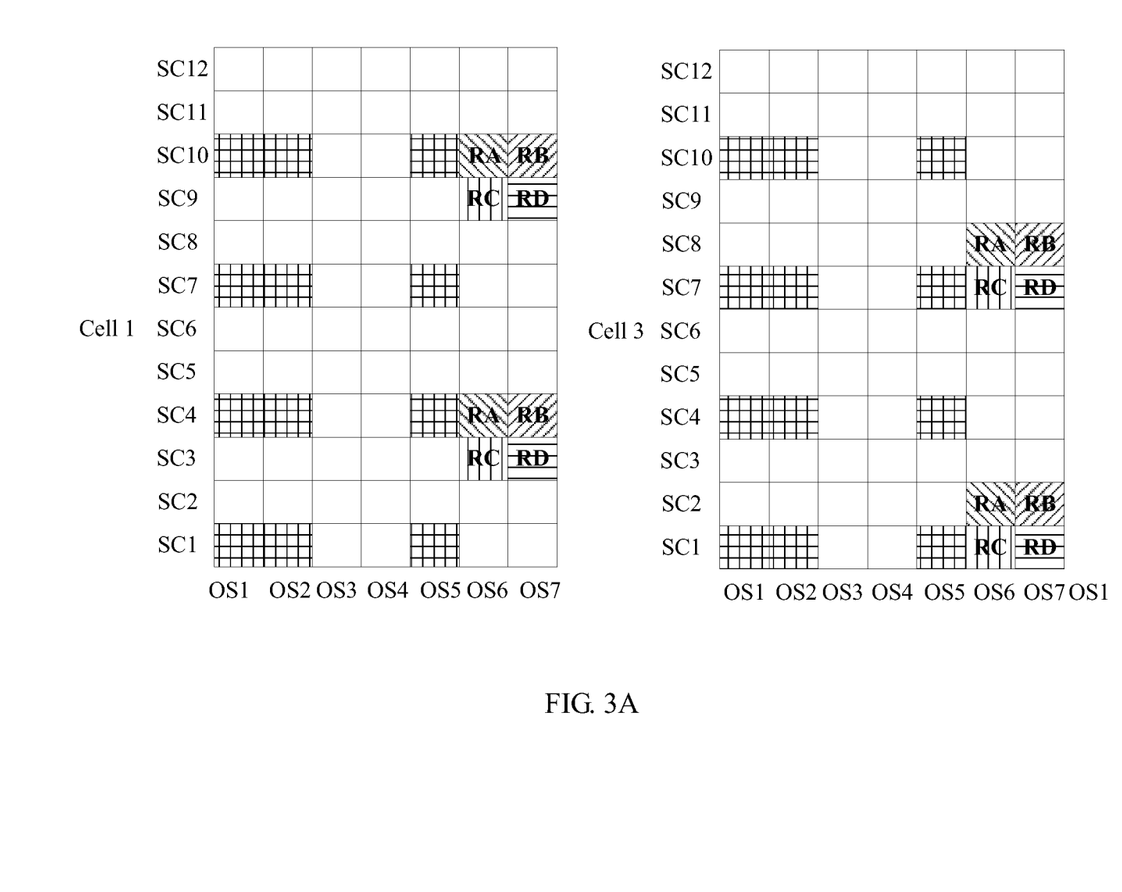
FIG. 3A and FIG. 3B are another schematic diagram of an energy decrease according to an embodiment of the present invention.
Figure 3B:
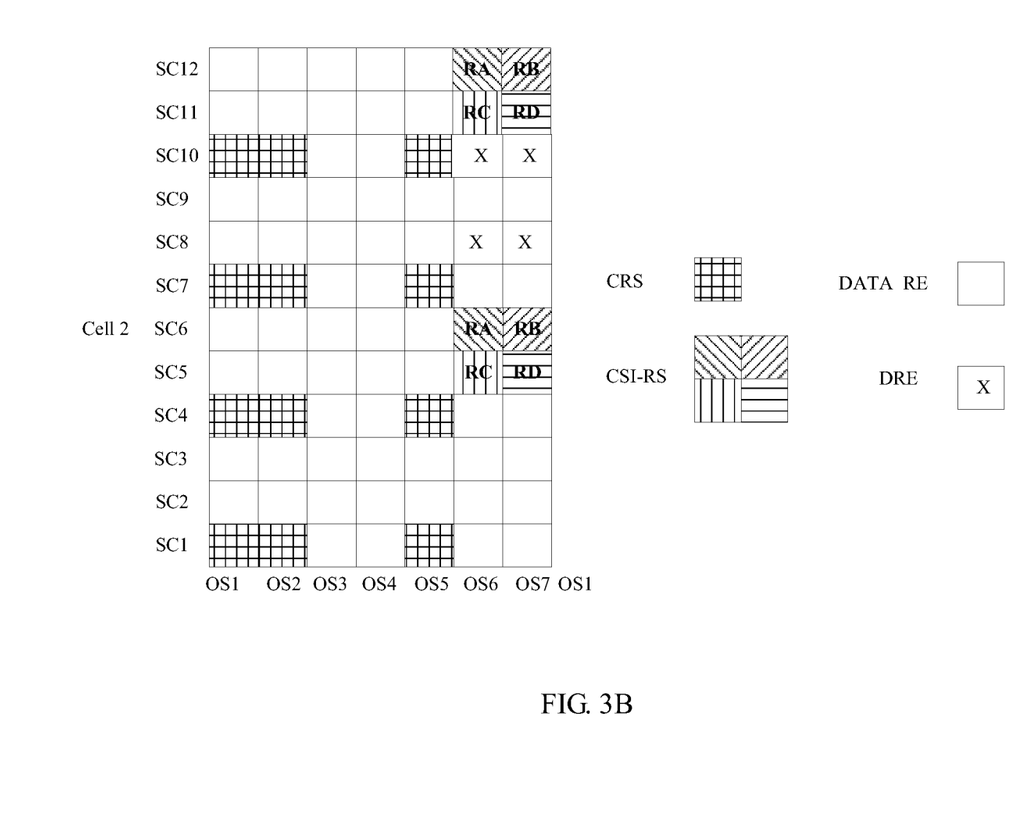

As shown in FIG. 3A and FIG. 3B, reference signals shown in the RA, RB, RC, and RD are reference signals on different ports A, B, C, and D in cells 1, 2, and 3. When an emitted energy decrease is performed on the resource elements of cell 2 (the current cell), only the resource elements in the current cell that collide with the reference signals on part of ports in the neighboring cell may be considered, such as the resource elements in the current cell that collide with the reference signals of the RA and RB, that is, an emitted energy decrease may be performed on the resource elements of SC10, SC8, SC4, and SC2 on OS6 and OS7 (the emitted energy decrease performed on the resource elements in SC4 and SC2 is not illustrated in FIG. 3A and FIG. 3B). Of course, an emitted energy decrease may also be only performed on part of resource elements in the current cell that collide with the reference signals of the RA and RB, that is, an emitted energy decrease may be only performed on the resource elements of SC10 and SC8 on OS6 and OS7.

Optionally, when multiple different neighboring cells exist, an emitted energy decrease may be performed on a resource element in the current cell that has a same time-frequency location as part or all of same resource elements where reference signals on part of same ports of the multiple different neighboring cells are located. As shown in FIG. 3A and FIG. 3B, an energy decrease may be only performed on a resource elements that has largest carrier number and is among the resource elements in the current cell that collide with reference signals on ports A and B of the multiple different neighboring cells.

Because the number of ports of different cells may be inconsistent, it is agreed that an emitted energy decrease is only performed on a resource element in the current cell that has a same time-frequency location as part or all of resource elements thereon. Thereby, the number of signaling interactions may be reduced, and a terminal can determine the emitted energy parameter and the location of a DRE according to a pre-agreed rule.

The reference signal may be a channel state information reference signal (CSI-RS) and/or a common reference signal (CRS).

When the reference signal is a CSI-RS, the notification to the UE may be cell-specific (Cell-specific), that is, the notifying the emitted energy parameter of the NRE to the user equipment (UE) includes: notifying the emitted energy parameter of the NRE to all user equipments (UEs) in the current cell; if it is agreed that the emitted energy parameters of NREs of all UEs are the same, all UEs in the current cell may be notified in a broadcast way.

When the reference signal is a CRS, the notification to the UE may be user equipment specific (UE-specific), that is, the notifying the emitted energy parameter of the NRE to the user equipment (UE) includes: notifying the emitted energy parameter of the NRE to a user equipment (UE) corresponding to a resource element in the current cell that has a same time-frequency location as part or all of resource elements occupied by the CRS.

When the reference signal includes both the CSI-RS and the CRS, the notifying the emitted energy parameter of the NRE to the user equipment (UE) includes: notifying, the emitted energy parameters of NRE in the current cell that has a same symbol time as the CSI-RS to all user equipments (UEs) in the current cell; and notifying the emitted energy parameters of NRE in the current cell that has a same symbol time as the CRS to a user equipment (UE) corresponding to a resource element in the current cell that has a same time-frequency location as part of a resource element occupied by the CRS.

The user equipment may be an LTE-A UE.

When the reference signal includes both the CSI-RS and the CRS-RS, the emitted energy parameters of different NREs corresponding to the reference signals may be notified to corresponding UEs respectively.

Optionally, the emitted energy of the DRE may be notified to the UE. If the emitted energy of the DRE is not decreased to 0, the DRE may be used to carry data information, and its emitted energy may be notified to the UE, so as to enable the UE to correctly decode or measure the DRE.

Optionally, the location of the DRE may be notified to the UE. The specific notification way may be as follows:

notifying the location of the DRE to the UE through signaling;

or, through binding the identity of the neighboring cell with the location of the DRE, obtaining, by the UE, the location of the DRE according to the identity of the neighboring cell. Specifically, the identity of the neighboring cell may be bound with the time-frequency location of the reference signal of the neighboring cell, so that the UE may know the location of the resource element in the current cell that collides with the reference signal of the neighboring cell and further determine the location of the DRE.

In addition, the location of the DRE and the decreased amount of energy of the DRE may be determined in advance according to the reference signal condition of the neighboring cell, and the emitted energy parameter of the NRE on the symbol where the corresponding DRE is located may be determined according to the location of the DRE and the decreased amount of energy of the DRE. The emitted energy parameter is configured for the UE in the current cell, which may specifically include:

performing, by a base station and according to the emitted energy parameter of the NRE, an energy reallocation on the RE on the symbol where an energy decrease has occurred, that is, adding the decreased energy of the DRE to the corresponding NRE.

The base station notifies the location of the symbol where the energy reallocation is performed (that is, the location of the symbol where the DRE is located) to the UE through signaling.

Or the reference signal mode of the neighboring cell is bound with the ID of the neighboring cell, and because the location where the reference signal of the neighboring cell occurs corresponds to the location of the symbol where the DRE is located, the UE may obtain the location of the symbol where the DRE is located according to the ID of the neighboring cell.

The UE obtains the emitted energy parameter of the NRE according to the location of the symbol where the DRE is located and the configured emitted energy parameter of the NRE.

The parameters dynamically or semi-statically configured for the UE may include the emitted energy parameter of the DRE. The UE may obtain the emitted energy of the DRE according to the location of the symbol where the DRE is located and the emitted energy parameter of the DRE. For example, the emitted energy parameter of the DRE is a ratio of the emitted energy of the DRE to standard emitted energy, $$\rho_e = \frac{EPRE_{DRE}}{EPRE_{Std}},$$

or a difference $\rho_e = EPRE_{DRE} - EPRE_{Std}$, where $EPRE_{Std}$ is the standard emitted energy, and $EPRE_{DRE}$ is the emitted energy of the DRE.

Specifically, how the UE knows the specific location of the DRE and the location of the NRE corresponding to the emitted energy parameter is similar to the method of the above embodiment and is not described here. If the base station performs an energy decrease on only part of REs as DREs, in which the part of RES will collide with the reference signal of the neighboring cell or the base station performs an energy reallocation on only part of REs in DREs, the base station may agree with the UE in advance or notify the UE through signaling.

In addition, the specific value of the emitted energy parameter relates to the number of energy decreased REs and may change according to the requirements on system performance, that is, the number of energy decreased REs may be reduced to increase the resource utilization, and the number of energy decreased REs may be increased to reduce the interference on the reference signal of the neighboring cell. In addition, because conventional terminals and LTE-A terminals may coexist in the system and conventional terminals do not support the emitted energy parameter, the decreased energy cannot be allocated to an RE corresponding to a conventional terminal, that is, the proportion of conventional terminals served by the base station also affects the value of the emitted energy parameter. Because of the change of the emitted energy parameter, the base station may semi-statically or dynamically configure the emitted energy parameter for the UE. Specifically, if the emitted energy parameter changes semi-statically, the UE may be notified through high-layer signaling; if the emitted energy parameter changes dynamically, the UE may be notified through physical layer signaling.

The emitted energy of the resource element may be indicated in the form of an emitted energy parameter, that is, the ratio of emitted energy of the resource element to the standard emitted energy or a difference between the emitted energy of the resource element and the standard emitted energy.

In the above embodiment, the UE may be a long term evolution advanced (LTE-A) UE, and the NRE may be a resource element corresponding to the LTE-A UE.

The emitted energy per resource element (EPRE, Energy per Resource Element) of the CSI-RS may or may not be equal to the EPRE of the CRS.

That is: $EPRE_{CSI\text{-}RS\ RE} = EPRE_{CRS\ RE}$

Or, $EPRE_{CSI\text{-}RS\ RE} \neq EPRE_{CRS\ RE}$

If not equal, a parameter $\rho_h$ may be defined based on the EPRE of the CRS to indicate the EPRE of the CSI-RS:

$$\rho_h = \frac{EPRE_{CSI\text{-}RS}}{EPRE_{CRS}},$$

and the EPRE of the CRS and the parameter $\rho_h$ may be notified to the UE, so that the UE obtains the EPRE of the CRS and the EPRE of the CSI-RS.

Or, a parameter $\rho'_h$ may be defined based on the EPRE of the CSI-RS to indicate the EPRE of the CRS:

$$\rho'_h = \frac{EPRE_{CRS}}{EPRE_{CSI\text{-}RS}},$$

and the EPRE of the CSI-RS and the parameter $\rho'_h$ may be notified to the UE, so that the UE obtains the EPRE of the CRS and the EPRE of the CSI-RS.

In the above embodiment, the executor of each step may be a base station.

According to the embodiment of the present invention, after an energy decrease is performed on a RE colliding with the reference signal of the neighboring cell (that is, the reference signal of the neighboring cell has a same time-frequency location as the RE in the current cell), the decreased energy may be reallocated, which may avoid the waste of emitted energy after the energy decrease, increase the emitted energy of part of REs, and further increase the signal to interference plus noise ratio (SINR) and throughput of service data, meanwhile improving the spectrum efficiency of the system.

Figure 4:
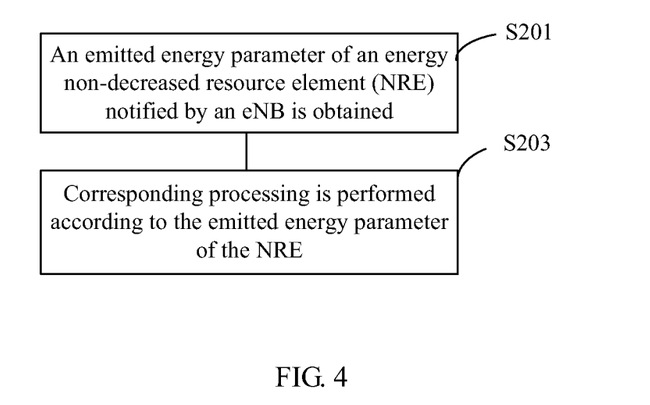
FIG. 4 is a flowchart of another method for notification of emitted energy according to an embodiment of the present invention.

As shown in FIG. 4, corresponding to the above embodiment, another method for notification of emitted energy according to an embodiment is provided. The method applies to the UE side and includes the following:

S201: Obtain an emitted energy parameter that is of an energy non-decreased resource element (NRE) and is notified by a base station.

The emitted energy parameter of the NRE is obtained by the base station according to a decreased amount of emitted energy which is an amount decreased by the base station from emitted energy of a resource element in a current cell that has a same time-frequency location as part or all of resource elements where a reference signal of a neighboring cell is located.

Specifically, the emitted energy parameter of the NRE may be the emitted energy of the NRE or may be the emitted energy parameter of the NRE. The emitted energy parameter that is of the NRE and is sent by the base station may be received through signaling.

Or, the emitted energy parameter of the NRE is obtained according to a cell identity, where the cell identity is bound with the emitted energy parameter of the NRE.

The emitted energy parameter is a ratio of the emitted energy of the NRE to standard emitted energy or a difference between the emitted energy of the NRE and the standard emitted energy.

Optionally, S203: Perform corresponding processing according to the emitted energy parameter of the NRE; for example, process the received NRE according to the emitted energy parameter of the NRE to calculate the SINR and demodulate data.

Optionally, the location that is of an emitted energy decreased resource element (DRE) and is notified by the base station may be received.

Specifically, the location that is of the DRE and is sent by the base station may be received through signaling.

Or, the location of the DRE is obtained according to the identity of the neighboring cell, where the identity of the neighboring cell is bound with the location of the DRE.

Optionally, the emitted energy of the DRE notified by the base station may be received. If the emitted energy of the DRE is not 0, the UE may process the received DRE according to the emitted energy of the DRE to calculate the SINR and demodulate data.

In addition, the location of the DRE and the decreased amount of energy of the DRE may be determined in advance according to the reference signal condition of the neighboring cell, and the emitted energy parameter of the NRE on the symbol where the corresponding DRE is located may be determined according to the location of the DRE and the decreased amount of energy of the DRE that are determined above. The emitted energy parameter is configured for the UE in the current cell.

The UE receives, from the base station, signaling that carries information about the location of the symbol where the DRE is located.

Or the reference signal mode of the neighboring cell is bound with the ID of the neighboring cell, and because the location where the reference signal of the neighboring cell occurs corresponds to the location of the symbol where the DRE is located, the UE can obtain the location of the symbol where the DRE is located according to the ID of the neighboring cell.

The UE obtains the emitted energy parameter of the NRE according to the location of the symbol where the DRE is located and the configured emitted energy parameter of the NRE.

According to the embodiment of the present invention, after an energy decrease is performed on REs colliding with the reference signal of the neighboring cell (that is, the reference signal of the neighboring cell has a same time-frequency location as the REs in the current cell), the decreased energy may be reallocated, which may avoid the waste of emitted energy after the energy decrease, increase the emitted energy of part of REs, and further increase the signal to interference plus noise ratio (SINR) and throughput of service data, meanwhile improving the spectrum efficiency of the system.

Figure 5:
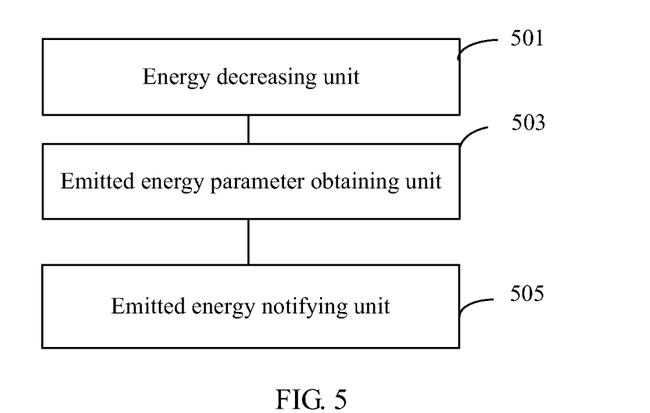
FIG. 5 is a schematic structural diagram of a base station according to an embodiment of the present invention.

As shown in FIG. 5, a base station corresponding to the above method embodiment is provided according to an embodiment of the present invention.

The energy decreasing unit 501 is configured to perform an emitted energy decrease on a resource element in a current cell that has a same time-frequency location as part or all of resource elements where a reference signal of a neighboring cell is located.

The reference signal of the neighboring cell is a reference signal on part of ports of the neighboring cell.

If multiple different neighboring cells exist, the performing the emitted energy decrease on the resource element in the current cell that has the same time-frequency location as part or all of resource elements where the reference signal of the neighboring cell is located includes:

performing an emitted energy decrease on the resource element in the current cell that has a same time-frequency location as part or all of same resource elements where reference signals on part of same ports of the multiple different neighboring cells are located.

The emitted energy parameter obtaining unit 503 is configured to obtain an emitted energy parameter of an energy non-decreased resource element (NRE) in the current cell according to a decreased amount of emitted energy of an emitted energy decreased resource element (DRE).

The emitted energy notifying unit 505 is configured to notify the emitted energy parameter of the NRE to a user equipment (UE).

The emitted energy parameter obtaining unit 503 may include:

an NRE emitted energy parameter obtaining subunit, configured to increase the emitted energy of part or all of the NREs to obtain the emitted energy parameters of the NREs, where the increased amount of emitted energy of the NREs is not greater than the decreased amount of emitted energy of the DREs on the symbol where the NREs are located.

The emitted energy notifying unit 505 may include:

an NRE signaling notifying unit, configured to notify the emitted energy parameter of the NRE to the UE through signaling;

and/or a first binding unit, configured to bind the identity of the current cell or the identity of the neighboring cell with the emitted energy parameter of the NRE, so that the UE obtains the emitted energy parameter of the NRE according to the identity of the current cell or the identity of the neighboring cell.

The emitted energy parameter is a ratio of the emitted energy of the NRE to standard emitted energy or a difference between the emitted energy of the NRE and the standard emitted energy.

When the reference signal is a channel state information reference signal (CSI-RS), the NRE signaling notifying unit is further configured to notify the emitted energy parameter of the NRE to all user equipments (UEs) in the current cell.

When the reference signal is a common reference signal (CRS), the NRE signaling notifying unit is further configured to notify the emitted energy parameter of the NRE to a user equipment (UE) corresponding to a resource element in the current cell that has a same time-frequency location as part or all of resource elements occupied by the CRS.

When the reference signal includes both the CSI-RS and the CRS, the NRE signaling notifying unit is further configured to notify the emitted energy parameters of NRE in the current cell that has a same symbol time as the CSI-RS to all user equipments (UEs) in the current cell; and notify the emitted energy parameters of NRE in the current cell that has a same symbol time as the CRS to a user equipment (UE) corresponding to the resource element in the current cell that has a same time-frequency location as part of a resource element occupied by the CRS.

Optionally, the base station may further include:

a DRE signaling notifying unit, configured to notify the location of the DRE to the UE through signaling;

and/or, a second binding unit, configured to bind the identity of the neighboring cell with the location of the DRE, so as to enable the UE to obtain the location of the DRE according to the identity of the neighboring cell.

The energy decreasing unit 501 may include:

an energy decreasing subunit, configured to partly or completely decrease the emitted energy of a resource element in the current cell that has a same time-frequency location as part or all of resource elements where the reference signal of the neighboring cell is located.

The base station may further include:

a DRE emitted energy notifying unit, configured to notify the emitted energy of the DRE to the UE.

The NRE in the above embodiment may include: a resource element occupied by a reference signal and/or a resource element occupied by a data signal. The UE may be a long term evolution advanced (LTE-A) UE, and the NRE may be a resource element corresponding to the LTE-A UE.

According to the embodiment of the present invention, after an energy decrease is performed on a RE colliding with the reference signal of the neighboring cell (that is, the reference signal of the neighboring cell has a same time-frequency location as the RE in the current cell), the decreased energy may be reallocated, which may avoid the waste of emitted energy after the energy decrease, increase the emitted energy of part of REs, and further increase the signal to interference plus noise ratio (SINR) and throughput of service data, meanwhile improving the spectrum efficiency of the system.

Figure 6:
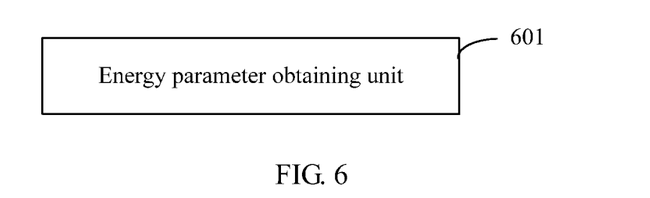
FIG. 6 is a schematic structural diagram of a UE according to an embodiment of the present invention.

As shown in FIG. 6, a user equipment (UE) corresponding to the above method embodiment is provided in an embodiment of the present invention. The UE includes:

an energy parameter obtaining unit 601, configured to obtain an emitted energy parameter that is of an energy non-decreased resource element (NRE) and is notified by a base station;

The emitted energy parameter of the NRE is obtained by the base station according to a decreased amount of emitted energy which is an amount decreased by the base station from emitted energy of a resource element in a current cell that has a same time-frequency location as part or all of resource elements where a reference signal of a neighboring cell is located.

The energy parameter obtaining unit 601 may include:

an NRE signaling receiving unit, configured to receive, through signaling, the emitted energy parameter that is of the NRE and is sent by the base station;

and/or, a third binding unit, configured to obtain the emitted energy parameter of the NRE according to a cell identity, where the cell identity is bound with the emitted energy parameter of the NRE.

The emitted energy parameter is a ratio of the emitted energy of the NRE to standard emitted energy or a difference between the emitted energy of the NRE and the standard emitted energy.

The UE may further include:

a DRE signaling receiving unit, configured to receive, through signaling, the location that is of an emitted energy decreased resource element (DRE) and is sent by the base station;

and/or, a fourth binding unit, configured to obtain the location of the emitted energy decreased resource element (DRE) according to the identity of the neighboring cell, where the identity of the neighboring cell is bound with the location of the DRE.

The UE may further include:

a processing unit, configured to perform corresponding processing according to the emitted energy parameter of the NRE; for example, process the received NRE according to the emitted energy parameter of the NRE to calculate the SINR and demodulate data.

According to the embodiment of the present invention, after an energy decrease is performed on REs colliding with the reference signal of the neighboring cell (that is, the reference signal of the neighboring cell has a same time-frequency location as the RE in the current cell), the decreased energy may be reallocated, which may avoid the waste of emitted energy after the energy decrease, increase the emitted energy of part of REs, and further increase the signal to interference plus noise ratio (SINR) and throughput of service data, meanwhile improving the spectrum efficiency of the system.

According to the above description of the embodiments, those skilled in the art may easily understand that the embodiments of the present invention may be implemented by using hardware, or by using software in combination with a universal hardware platform. Based on such understanding, the technical solution of the present invention may be represented by a software product, which may be stored in a nonvolatile storage medium, such as a CD-ROM, a USB disk, and a removable hard disk. The software product includes a number of instructions that enable a computer device (which may be a personal computer, a server or an access device) to execute the method according to the embodiments of the present invention.

Disclosed above are merely exemplary embodiments of the present invention, and the present invention is not limited thereto. Modifications and variations readily apparent to those skilled in the art shall fall within the protection scope of the present invention.

What is claimed is:

1. A method for notifying emitted energy, comprising:
performing an emitted energy decrease on a resource element in a current cell that has a same time-frequency location as part or all of resource elements where a reference signal of a neighboring cell is located;
obtaining an emitted energy parameter of an energy non-decreased resource element (NRE) in the current cell; wherein the emitted energy parameter of the NRE is a ratio of the emitted energy of the NRE to standard emitted energy, $$\rho_c = \frac{EPRE_{NRE}}{EPRE_{Std}},$$

or a difference $\rho_c = EPRE_{NRE} - EPRE_{Std}$, wherein $EPRE_{Std}$ is the standard emitted energy, $EPRE_{NRE}$ is the emitted energy of the NRE, and the standard emitted energy $EPRE_{Std}$ is emitted energy $EPRE_{CRS}$ of a common reference signal (CRS) or emitted energy $EPRE_{CSI-RS}$ of a channel state information reference signal (CSI-RS); and
notifying the emitted energy parameter of the NRE to a user equipment (UE) through signaling.

2. The method according to claim 1, further comprising:
notifying a location of the DRE to the UE through signaling;
or, notifying an identity of the neighboring cell to the UE, wherein the identity of the neighboring cell is bound with the location of the DRE.

3. The method according to claim 1, wherein: the reference signal of the neighboring cell is a reference signal on at least one port among ports of the neighboring cell; and
if multiple different neighboring cells exist, the performing the emitted energy decrease on the resource element in the current cell that has the same time-frequency location as part or all of resource elements where the reference signal of the neighboring cell is located comprises:
performing an emitted energy decrease on the resource element in the current cell that has a same time-frequency location as part or all of same resource elements where reference signals on at least one port among same ports of the multiple different neighboring cells are located.

4. A method for notifying emitted energy, comprising:
performing an emitted energy decrease on a resource element in a current cell that has a same time-frequency location as part or all of resource elements where a reference signal of a neighboring cell is located;

obtaining an emitted energy parameter of an energy non-decreased resource element (NRE) in the current cell according to a decreased amount of emitted energy of an emitted energy decreased resource element (DRE); and notifying the emitted energy parameter of the NRE to a user equipment wherein:

when the reference signal is a channel state information reference signal (CSI-RS), the notifying the emitted energy parameter of the NRE to the UE comprises: notifying the emitted energy parameter of the NRE to all UE in the current cell;

when the reference signal is a common reference signal (CRS), the notifying the emitted energy parameter of the NRE to the UE comprises: notifying the emitted energy parameter of the NRE to a UE corresponding to the resource element in the current cell that has a same time-frequency location as part or all of resource elements occupied by the CRS; and when the reference signal comprises both the CSI-RS and CRS, the notifying the emitted energy parameter of the NRE to the UE comprises: notifying the emitted energy parameter of the NRE in the current cell that has a same symbol time as the CSI-RS to all UE in the current cell; and notifying emitted energy parameter of NRE in the current cell that has a same symbol time as the CRS to a UE corresponding to a resource element in the current cell that has a same time-frequency location as part of resource elements occupied by the CRS.

5. A method for notifying emitted energy, comprising:

performing an energy decrease on a resource element in a current cell that has a same time-frequency location as part or all of resource elements where a reference signal of a neighboring cell is located;

obtaining an emitted energy parameter of an energy non-decreased resource element (NRE) in the current cell according to a decreased amount of emitted energy of an emitted energy decreased resource element (DRE); and notifying the emitted energy parameter of the NRE to a user equipment (UE), wherein:

when the NRE is a resource element occupied by a reference signal, the emitted energy parameter of the NRE comprises $$\rho_{c1} = \frac{EPRE'_{Reference\ Signal}}{EPRE_{Std}};$$

or when the NRE is a resource element occupied by a data signal, the emitted energy parameter of the NRE comprises $$\rho_{c2} = \frac{EPRE'_{Data\ Signal}}{EPRE_{Std}};$$

or when the NRE comprises a resource element occupied by a reference signal and a resource element occupied by a data signal, the emitted energy parameter of the NRE comprises $$\rho_{c1} = \frac{EPRE'_{Reference\ Signal}}{EPRE_{Std}} \text{ and } \rho_{c2} = \frac{EPRE'_{Data\ Signal}}{EPRE_{Std}};$$

or when the reference signal comprises both a channel state information reference signal (CSI-RS) and a common reference signal (CRS) and when the NRE is a resource element occupied by a reference signal, the emitted energy parameter of the NRE comprises $$\rho_{c3} = \frac{EPRE'_{CSI-RS}}{EPRE_{Std}} \text{ and } \rho_{c4} = \frac{EPRE'_{CRS}}{EPRE_{Std}};$$

or when the reference signal comprises both the CSI-RS and the CRS and when the NRE comprises a resource element occupied by a reference signal and a resource element occupied by a data signal, the emitted energy parameter of the NRE comprises $$\rho_{c2} = \frac{EPRE'_{Data\ Signal}}{EPRE_{Std}}, \rho_{c3} = \frac{EPRE'_{CSI-RS}}{EPRE_{Std}}, \text{ and}$$

$$\rho_{c4} = \frac{EPRE'_{CRS}}{EPRE_{Std}};$$

wherein, the $EPRE'_{Reference\ Signal}$ is energy per resource element (EPRE) of the reference signal after the emitted energy is increased, the $EPRE'_{Data\ Signal}$ is EPRE of the data signal after the emitted energy is increased, the $EPRE'_{CSI-RS}$ is EPRE of the CSI-RS after the emitted energy is increased, the $EPRE'_{CRS-RS}$ is EPRE of the CRS-RS after the emitted energy is increased, the $EPRE_{Std}$ is the standard emitted energy, and the standard emitted energy $ERPE_{Std}$ is emitted energy $EPRE_{CRS}$ of the CRS or emitted energy $EPRE_{CSI-RS}$ of the CSI-RS.

6. A method for notifying emitted energy, comprising:

receiving, through signaling, an emitted energy parameter that is of an energy non-decreased resource element (NRE) and is notified by a base station;

wherein, the emitted energy parameter of the NRE is a ratio of the emitted energy of the NRE to standard emitted energy, $$\rho_c = \frac{EPRE_{NRE}}{EPRE_{Std}},$$

or a difference $\rho_c = EPRE_{NRE} - EPRE_{Std}$ wherein $EPRE_{Std}$ is the standard emitted energy $EPRE_{NRE}$ is the emitted energy of the NRE, and the standard emitted energy $EPRE_{Std}$ is emitted energy $EPRE_{CRS}$ of a common reference signal (CRS) or emitted energy $EPRE_{CSI-RS}$ of a channel state information reference signal (CSI-RS);

performing corresponding processing according to the obtained emitted energy parameter.

7. The method according to claim 6, comprising:

receiving, through signaling, a location that is of an emitted energy decreased resource element (DRE) and is sent by the base station;

or, obtaining the location of the emitted energy decreased resource element (DRE) according to an identity of the neighboring cell, wherein the identity of the neighboring cell is bound with the location of the DRE.

8. A method for notifying emitted energy, comprising:

obtaining an emitted energy parameter that is of an energy non-decreased resource element (NRE) and is notified by a base station;

wherein, the emitted energy parameter of the NRE is obtained by the base station according to a decreased amount of emitted energy which is an amount decreased by the base station from emitted energy of a resource element in a current cell that has a same time-frequency location as part or all of resource elements where a reference signal of a neighboring cell is located;

performing corresponding processing according to the obtained emitted energy parameter, wherein:

when the NRE is a resource element occupied by a reference signal, the emitted energy parameter of the NRE comprises $$\rho_{c1} = \frac{EPRE'_{Reference\ Signal}}{EPRE_{Std}};$$

or when the NRE is a resource element occupied by a data signal, the emitted energy parameter of the NRE comprises $$\rho_{c2} = \frac{EPRE'_{Data\ Signal}}{EPRE_{Std}};$$

or when the NRE comprises a resource element occupied by a reference signal and a resource element occupied by a data signal, the emitted energy parameter of the NRE comprises $$\rho_{c1} = \frac{EPRE'_{Reference\ Signal}}{EPRE_{Std}} \text{ and } \rho_{c2} = \frac{EPRE'_{Data\ Signal}}{EPRE_{Std}};$$

or when the reference signal comprises both a channel state information reference signal (CSI-RS) and a common reference signal (CRS) and when the NRE is a resource element occupied by a reference signal, the emitted energy parameter of the NRE comprises $$\rho_{c3} = \frac{EPRE'_{CSI-RS}}{EPRE_{Std}} \text{ and } \rho_{c4} = \frac{EPRE'_{CRS}}{EPRE_{Std}};$$

or when the reference signal comprises both the CSI-RS and the CRS and when the NRE is a resource element occupied by a data signal, the emitted energy parameter of the NRE comprises $$\rho_{c2} = \frac{EPRE'_{Data\ Signal}}{EPRE_{Std}}, \rho_{c3} = \frac{EPRE'_{CSI-RS}}{EPRE_{Std}}, \text{ and}$$

$$\rho_{c4} = \frac{EPRE'_{CRS}}{EPRE_{Std}};$$

wherein, the $EPRE'_{Reference\ Signal}$ is energy per resource element (EPRE) of the reference signal after the emitted energy is increased, the $EPRE'_{Data\ Signal}$ is EPRE of the data signal after the emitted energy is increased, the $EPRE_{CSI-RS}$ is EPRE of the CSI-RS after the emitted energy is increased, the $EPRE_{CRS}$ is EPRE of the CRS after the emitted energy is increased, the $EPRE_{Std}$ $EPRE_{Std}$ is the standard emitted energy, and the standard emitted energy $EPRE_{Std}$ is emitted energy $EPRE_{CRS}$ of the CRS or emitted energy $EPRE_{CSI-RS}$ of the CSI-RS.

9. A base station, comprising:

an energy decreasing unit, configured to perform an emitted energy decrease on a resource element in a current cell that has a same time-frequency location as part or all of resource elements where a reference signal of a neighboring cell is located;

an emitted energy parameter obtaining unit, configured to obtain an emitted energy parameter of an energy non-decreased resource element (NRE) in the current cell wherein the emitted energy parameter of the NRE is a ratio of the emitted energy of the NRE to standard emitted energy, $$\rho_c = \frac{EPRE_{NRE}}{EPRE_{Std}},$$

or a difference $\rho_c = EPRE_{NRE} - EPRE_{Std}$, wherein $EPRE_{Std}$ is the standard emitted energy, $EPRE_{NRE}$ is the emitted energy of the NRE, and the standard emitted energy $EPRE_{Std}$ is emitted energy $EPRE_{CRS}$ of a common reference signal (CRS) or emitted energy $EPRE_{CSI-RS}$ of a channel state information reference signal (CSI-RS); and an emitted energy notifying unit, configured to notify the emitted energy parameter of the NRE to a user equipment (UE) through signaling.

10. The base station according to claim 9, wherein the emitted energy parameter obtaining unit comprises:

an NRE emitted energy parameter obtaining subunit, configured to increase emitted energy of part or all of NREs to obtain the emitted energy parameters of the NREs, wherein an increased amount of emitted energy of the NREs is not greater than the decreased amount of emitted energy of the DRE on a symbol where the NREs are located.

11. The base station according to claim 9, further comprising:

a DRE signaling notifying unit, configured to notify a location of the DRE to the UE through signaling;

and/or, a second binding unit, configured to bind an identity of the neighboring cell with the location of the DRE, so that the UE obtains the location of the DRE according to the identity of the neighboring cell.

12. The base station according to claim 9, wherein the energy decreasing unit comprises:

an energy decreasing subunit, configured to partly or completely decrease emitted energy of the resource element in the current cell that has a same time-frequency location as part or all of resource elements where the reference signal of the neighboring cell is located; and the base station further comprises:

a DRE emitted energy notifying unit, configured to notify the emitted energy of the DRE to the UE.

13. A user equipment (UE), comprising:

an energy parameter obtaining unit, configured to obtain an emitted energy parameter that is of an energy non-decreased resource element (NRE) and is notified by a base station;

wherein, the emitted energy parameter of the NRE is a ratio of the emitted energy of the NRE to standard emitted energy, $$\rho_c = \frac{EPRE_{NRE}}{EPRE_{Std}},$$

or a difference $\rho_c = EPRE_{NRE} - EPRE_{Std}$, wherein $EPRE_{Std}$ is the standard emitted energy, $EPRE_{NRE}$ is the emitted energy of the NRE, and the standard emitted energy $EPRE_{Std}$ is emitted energy $EPRE_{CRS}$ of a common reference signal (CRS) or emitted energy $EPRE_{CSI-RS}$ of a channel state information reference signal (CSI-RS):

a processing unit, configured to perform corresponding processing according to the emitted energy parameter of the NRE.

14. The UE according to claim 13, comprising:

a DRE signaling receiving unit, configured to receive, through signaling, a location that is of an emitted energy decreased resource element (DRE) and is sent by the base station;

and/or, a fourth binding unit, configured to obtain the location of the emitted energy decreased resource element (DRE) according to an identity of the neighboring cell, wherein the identity of the neighboring cell is bound with the location of the DRE.

* * * * *